US012584613B2

(12) United States Patent
Kim et al.

(10) Patent No.: US 12,584,613 B2
(45) Date of Patent: Mar. 24, 2026

(54) LIGHT-EMITTING MODULE

(71) Applicant: SEOUL SEMICONDUCTOR CO., LTD., Ansan-si (KR)

(72) Inventors: Woo Seok Kim, Ansan-si (KR); Do Kwang Lee, Ansan-si (KR)

(73) Assignee: SEOUL SEMICONDUCTOR CO., LTD., Ansan-si (KR)

( * ) Notice: Subject to any disclaimer, the term of this patent is extended or adjusted under 35 U.S.C. 154(b) by 0 days.

(21) Appl. No.: 19/044,101

(22) Filed: Feb. 3, 2025

(65) Prior Publication Data

US 2025/0180192 A1 Jun. 5, 2025

Related U.S. Application Data

(63) Continuation of application No. 18/362,504, filed on Jul. 31, 2023, now Pat. No. 12,222,089, which is a continuation of application No. PCT/KR2022/001630, filed on Jan. 28, 2022.

(60) Provisional application No. 63/144,032, filed on Feb. 1, 2021.

(51) Int. Cl.

*F21V 19/00* (2006.01)
*F21V 31/00* (2006.01)
*F21Y 115/10* (2016.01)

(52) U.S. Cl.

CPC ........ *F21V 19/0035* (2013.01); *F21V 31/005* (2013.01); *F21Y 2115/10* (2016.08)

(58) Field of Classification Search

CPC ............................. F21V 19/0035; F21V 17/12
See application file for complete search history.

(56) References Cited

U.S. PATENT DOCUMENTS 8,128,263 B2 3/2012 Higuchi et al.
2007/0076427 A1 4/2007 Reo et al.
2013/0170214 A1* 7/2013 Lee .................... F21V 19/0035 362/249.02

(Continued)

FOREIGN PATENT DOCUMENTS

CN 209370859 U 9/2019
JP 5848631 B2 1/2016

(Continued)

OTHER PUBLICATIONS

International Search Report from PCT/KR2022/001630 dated May 16, 2022 (3 pages).

*Primary Examiner* — Eric T Eide
(74) *Attorney, Agent, or Firm* — Perkins Coie LLP

(57) ABSTRACT

A light emitting module is provided to comprise: a light source unit including at least one light-emitting element; a lens unit arranged on the light source unit and including a first fastening hole; a substrate having an upper and lower surfaces and including a second fastening hole, the light source unit arranged on the upper surface; and a fastening unit arranged inside of the first fastening hole and the second fastening hole, wherein the first fastening hole and the second fastening hole are arranged to correspond to each other. The substrate has a height in a vertical direction from the upper surface to the lower surface, and a height of a region of the substrate where the fastening portion is disposed and a height of a region of the substrate where the fastening portion is not disposed are same as the height of the substrate.

22 Claims, 6 Drawing Sheets

(56) References Cited

U.S. PATENT DOCUMENTS

| | | | |
|---|---|---|---|
| 2017/0114993 | A1 | 4/2017 | Kim et al. |
| 2023/0143772 | A1 | 5/2023 | Hameau |
| 2023/0375164 | A1 | 11/2023 | Kim et al. |

FOREIGN PATENT DOCUMENTS

| | | | |
|---|---|---|---|
| KR | 101217732 | B1 | 1/2013 |
| KR | 20170045812 | A | 4/2017 |
| KR | 20190024406 | A | 3/2019 |
| KR | 20190103758 | A | 9/2019 |

* cited by examiner

LIGHT-EMITTING MODULE

CROSS-REFERENCE TO RELATED APPLICATION

This application is a continuation of U.S. patent application Ser. No. 18/362,504, filed on Jul. 31, 2023, which is a continuation of International Patent Application No. PCT/KR2022/001630, filed on Jan. 28, 2022, which further claims priority to and the benefit of U.S. Provisional Application No. 63/144,032, filed on Feb. 1, 2021. The entire contents of the above noted applications are incorporated by reference as part of the disclosure of this document.

TECHNICAL FIELD

The present disclosure relates to a light emitting module.

BACKGROUND

A light emitting module has been manufactured using a light emitting diode, which is a high efficiency light emitting device. Such a light emitting module may form an LED lighting module by using a light emitting diode having low heat generation and low power consumption as a light source, and light emitting apparatuses such as various lighting devices may be easily manufactured and used with the light emitting module.

SUMMARY

Exemplary embodiments provide a light emitting module having a robust assembly and effective moisture proof function.

Exemplary embodiments provide a lightweight light emitting module that can be used universally without limitation to an application target.

In an embodiment of the present disclosure, a light emitting module may include a light source portion including at least one light emitting device; a lens portion disposed over the light source portion and including a first fastening hole; a substrate having an upper surface and including a second fastening hole, the light source portion disposed on the upper surface of the substrate; and a fastening portion disposed inside the first fastening hole and the second fastening hole. The first fastening hole and the second fastening hole may be disposed to correspond to each other, and the substrate may have a height in a vertical direction from the upper surface to the lower surface, and a height of a region of the substrate where the fastening portion is disposed and a height a region of the substrate where the fastening portion is not disposed are same as the height of the substrate.

In some implementations, a height of a region of the substrate including the second fastening hole and a height of a region of the substrate not including the second fastening hole are same as the height of the substrate.

In some implementations, the first fastening hole may include an upper surface and a lower surface, the upper surface of the first fastening hole may include an inclined step, and a width of the upper surface of the first fastening hole may be formed greater than that of the lower surface thereof.

In some implementations, the second fastening hole may include an upper surface and a lower surface, and the upper surface and the lower surface of the second fastening hole may be formed to have a same width.

In some implementations, the second fastening hole may include an upper surface and a lower surface, the width of the upper surface of the second fastening hole may be formed smaller than that of the lower surface, and the lower surface of the second fastening hole may have an inclined step.

In some implementations, the fastening portion may have an upper surface, a lower surface, and a through portion extending in a vertical direction from the upper surface to the lower surface of the fastening portion.

In some implementations, the fastening portion may include an upper portion and a lower portion, the upper portion of the fastening portion may be coupled with the first fastening hole, and the lower portion of the fastening portion may be coupled with the second fastening hole.

In some implementations, the upper portion of the fastening portion may have a length greater than a length of the lower portion of the fastening portion.

In some implementations, the upper surface of the fastening portion may have a width greater than those of the lower surface and the through portion.

In some implementations, the upper surface and the lower surface of the fastening portion may have a width greater than that of the through portion, and the lower surface of the fastening portion may have an inclined step.

In another aspect, a light emitting module is provided to include: a light source portion including at least one light emitting device; a lens portion disposed over the light source portion and including a first fastening hole; a substrate on which the light source portion is disposed and including a second fastening hole; and a fastening portion disposed inside the first fastening hole and the second fastening hole, in which the fastening portion may include an upper portion and a lower portion, the upper portion of the fastening portion may be in contact with the first fastening hole, the lower portion of the fastening portion may be disposed to be in contact with the second fastening hole, and the upper portion and the lower portion of the fastening portion may be formed to have different lengths from each other.

In some implementations, the substrate may have a height in a vertical direction from the upper surface to the lower surface of the substrate, and a height of a region of the substrate where the fastening portion is disposed and a height of a region of the substrate where the fastening portion is not disposed are same as the height of the substrate.

In some implementations, the substrate may have a height in a vertical direction from the upper surface to the lower surface of the substrate, and a height of a region of the substrate including the second fastening hole and a height of a region of the substrate not including the second fastening hole are same as the height of the substrate.

In some implementations, a thickness of the lens portion may be greater than a thickness of the substrate.

In some implementations, the first fastening hole may include an upper surface and a lower surface, the upper surface of the first fastening hole may include an inclined step, and a width of the upper surface of the first fastening hole may be formed greater than that of the lower surface.

In some implementations, the second fastening hole may include an upper surface and a lower surface, the width of the upper surface of the second fastening hole may be formed smaller than that of the lower surface, and the lower surface of the second fastening hole may have an inclined step.

In some implementations, the light source portion may include a printed circuit board and a light emitting device, and the printed circuit board of the light source portion and the substrate may be integrally formed.

In some implementations, the printed circuit board may have a third fastening hole in which at least a portion of the fastening portion is disposed.

In some implementations, a first adhesive layer disposed between the lens portion and the substrate may be further included.

In some implementations, a sealing portion disposed between the lens portion and the substrate may be further included.

In some implementations, a second adhesive layer disposed under the substrate may be further included.

A light emitting module according to an embodiment of the present disclosure may effectively prevent moisture by reducing a separation between a lens portion and a substrate.

In the light emitting module according to an embodiment of the present disclosure, a lower surface of the substrate is formed flat, so that it is possible to manufacture a light emitting module that can be used universally without limitation of an application target.

DETAILED DESCRIPTION

Figure 1:
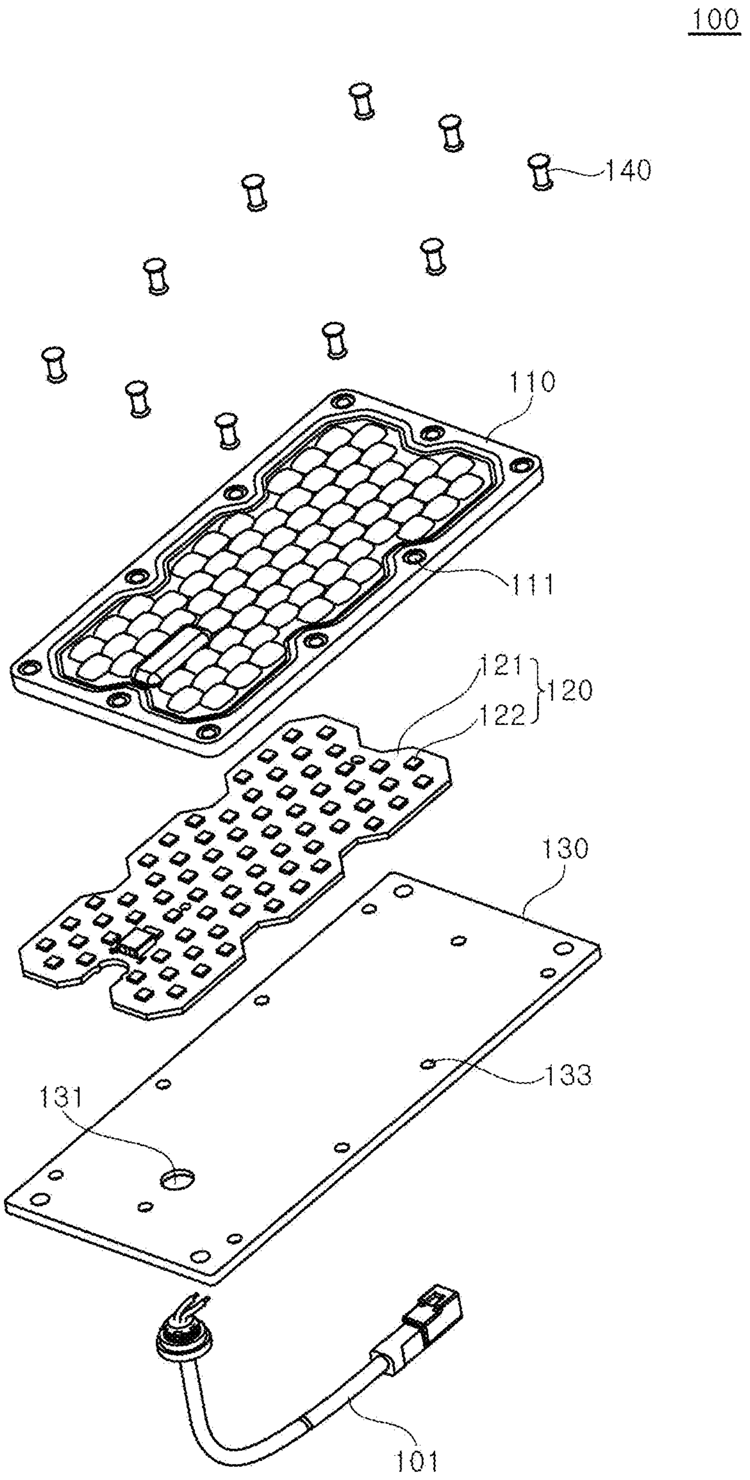
FIG. 1 is a schematic exploded perspective view illustrating a light emitting module according to an embodiment of the present disclosure.

Hereinafter, embodiments of the present disclosure will be described in detail with reference to the accompanying drawings. The following embodiments are provided by way of example to facilitate the understanding of various implementations of the disclosed technology. Accordingly, the present disclosure is not limited to the embodiments disclosed herein and can also be implemented in different forms. In the drawings, widths, lengths, thicknesses, and the like of devices can be exaggerated for clarity and descriptive purposes. When an element or layer is referred to as being “disposed above” or “disposed on” another element or layer, it can be directly “disposed above” or “disposed on” the other element or layer or intervening devices or layers can be present. Throughout the specification, like reference numerals denote like devices having the same or similar functions.

The light emitting module may significantly improve the heat dissipation function by including a heat dissipation body having heat dissipation efficiency in the module itself in order to relieve thermal stress generated in the light emitting diode. In a conventional light emitting module, the thickness and volume of its heat dissipation body which maintains heat dissipation efficiency increases in order to emit heat generated from a light emitting device, and the size and weight of each lighting device also increases. Accordingly, it is difficult to reduce the weight and size of the lighting device itself. In addition, in the case of the lighting device, the lifespan of the light emitting diode can be maintained by blocking the inflow of moisture from the outside only by maintaining airtightness due to its characteristics.

Various implementations of the disclosed technology will be described in reference to the drawings in the below. According to various implementations, it is possible to provide a light emitting module that can effectively prevent moisture by reducing a separation between a lens portion and a substrate. Some implementations of the disclosed technology provide a light emitting module in which a lower surface of the substrate is formed flat. Thus, it is possible to manufacture a light emitting module that can be used universally without limitation of an application target.

FIGS. 1, 2A, 2B, and 2C are an exploded perspective view, a perspective view and cross-sectional views illustrating a light emitting apparatus according to an embodiment of the present disclosure.

Referring to FIGS. 1, 2A, 2B, and 2C, a light emitting apparatus 100 may include a lens portion 110, a light source portion 120 disposed under the lens portion 110, a substrate 130 disposed opposite to a lower surface of the lens portion 110, and a fastening portion 140 for coupling the lens portion 110 and the substrate 130.

In this embodiment, the lens portion 110 may be disposed at an uppermost end of the light emitting apparatus 100. Thus, the lens portion 110 may be disposed over the substrate 130, the light source portion 120. At least a portion of the lower surface of the lens portion 110 may be flat, and at least a portion of an upper surface of the lens portion 110 may be convex. More specifically, an edge region of a convex portion of the lens portion 110 may be flat, and a position of the convex portion of the lens portion 110 may vary depending on an arrangement of the light source portion 120. A light distribution shape may be controlled according to a length and a width of the convex portion of the lens portion 110, and the light emitting apparatus 100 according to an embodiment of the present disclosure may have a wide light distribution shape to distribute light to an outer region which is far from the light source portion 120. In addition, the lens portion 110 may protect the light source portion 120.

The lens portion 110 may include a material capable of transmitting light emitted from the light source portion 120. For example, the lens portion 110 may be made of or include a material such as silicone or epoxy, or may include at least one of glass, acrylic resin such as PMMA (Polymethyl Methacrylate), PET (Polyethylene Terephthalate), PC (Poly Carbonate), COC (Cycloolefin Copolymer), or PEN (Polyethylene Naphthalate) resin.

At least a portion of a flat lower surface of the lens portion 110 may be in contact with and coupled to the substrate 130. Accordingly, the lens portion 110 may include at least one first fastening hole 111 to be coupled with the substrate 130. The first fastening hole 111 may be disposed through an inner side of the lens portion 110, and may include a shape which is concave at least partially toward the upper surface of the lens portion 110. More specifically, an upper portion 141 (shown in FIG. 2C) of the fastening portion 140 to be described later may be disposed in the first fastening hole 111, and an upper portion of the first fastening hole 111 may include a stepped structure having a different width from a lower portion to fasten the fastening portion 140 in a robust state.

The light source portion 120 may be formed at a corresponding position opposite to the lens portion 110. The light source portion 120 may include a printed circuit board 121 on which interconnections for applying power are formed and at least one light emitting device 122 that emits light. The printed circuit board 121 may be a resin material, a metal material, or a printed circuit board having flexibility, and the light emitting device 122 may be mounted on the printed circuit board 121.

In some implementations, the light emitting device 122 is a package in which light emitting chips are packaged, and may include an optical lens. The light emitting chip may emit at least one of red, green, blue, or UV light. The light emitting device 122 may emit at least one of white, red, green, or blue light. For example, white light may be emitted for illumination.

Intervals between the light emitting devices 122 may be same as those of the convex portions of the lens portion 110. In the embodiment of the present disclosure, a plurality of light source portions 120 are alternately arranged, but the inventive concepts are not limited thereto, and the number and the arrangement of the light source portions 120 may be variously changed according to a user environment.

Corresponding to the lower surface of the lens portion 110, a substrate 130 disposed to contact at least a portion of the lens portion 110 may be formed. The substrate 130 has an upper surface, a lower surface corresponding to the upper surface, and a side surface connecting the upper surface and the lower surface. The substrate 130 may be formed to have a width greater than that of the lens portion 110. Accordingly, the side surface of the substrate 130 may be disposed outside a side surface of the lens portion 110. In addition, the substrate 130 may be formed to have the width greater than that of the light source portion 120.

The light source portion 120 may be disposed on the upper surface of the substrate 130, and a central axis of the substrate 130 may coincide with central axes of the light source portion 120 and the lens portion 110.

The substrate 130 may include at least one second fastening hole 133 to be coupled with the light source portion 120 and the lens portion 110. The second fastening hole 133 may be disposed at a position corresponding to the first fastening hole 111 of the lens portion 110. The second fastening hole 133 may be disposed through an inner side of the substrate 130, and a lower portion 142 of the fastening portion 140 to be described later may be disposed in the second fastening hole 133. As such, the second fastening hole 133 may provide a space in which at least a portion of the fastening portions 140 are disposed for fastening the lens portion 110 and the substrate 130.

In addition, the substrate 130 may have a region where the fastening portion 140 is disposed and a region where the fastening portion 140 is not disposed. Referring to FIG. 1, the light source portion 120 may be disposed in the region of the substrate 130 where the fastening portion 140 is not disposed. However, the light source portion 120 is not limited thereto, and the light source portion 120 may be disposed on the substrate 130 without distinguishing between the region where the fastening portion 140 is disposed and the region where the fastening portion 140 is not disposed.

Figure 2A:
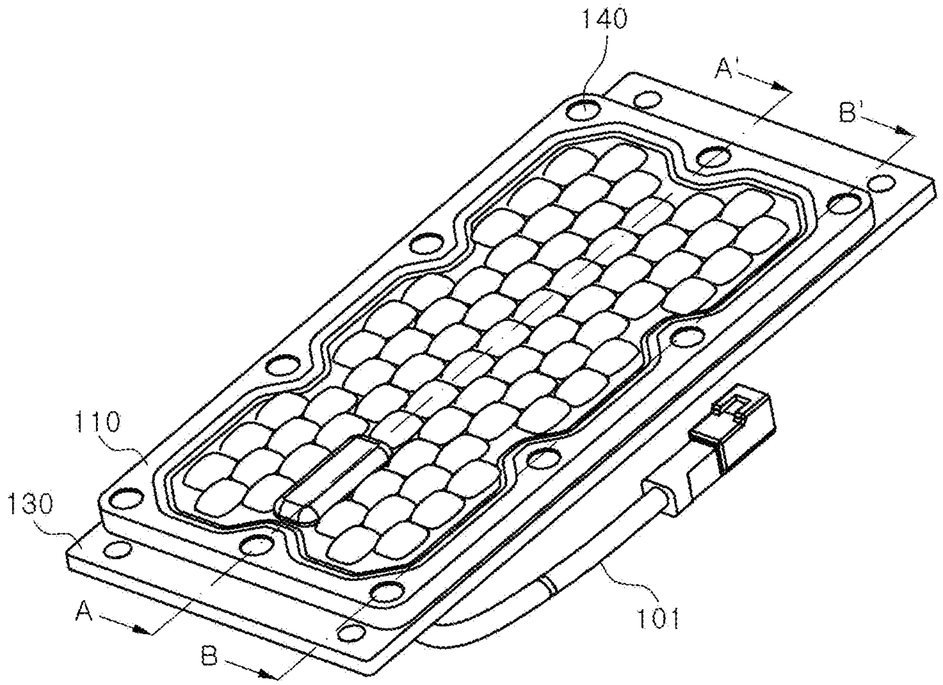
FIG. 2A is a combined perspective view illustrating the light emitting module of FIG. 1.
Figure 2B:
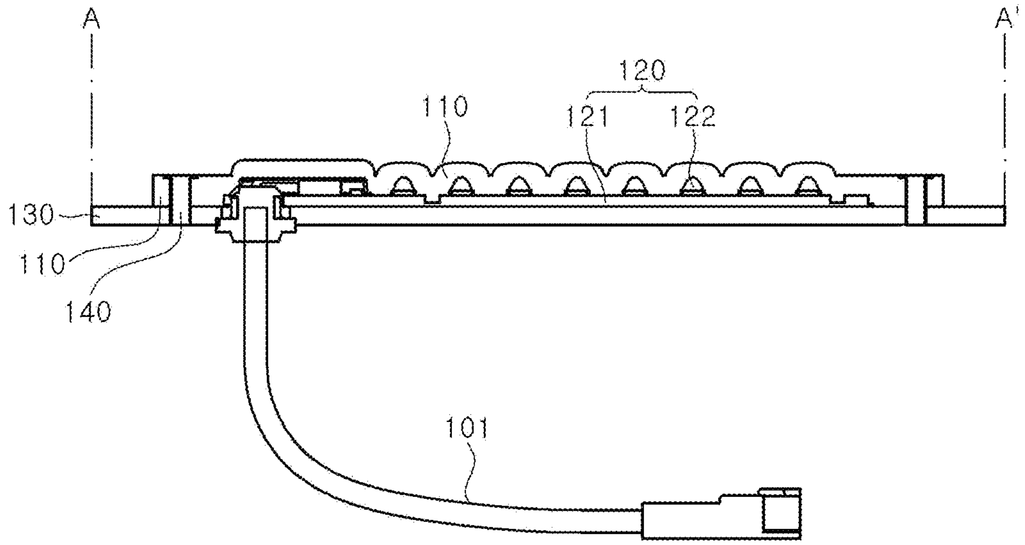
FIG. 2B is an A-A' cross-sectional view of the light emitting module according to FIG. 2A.
Figure 2C:
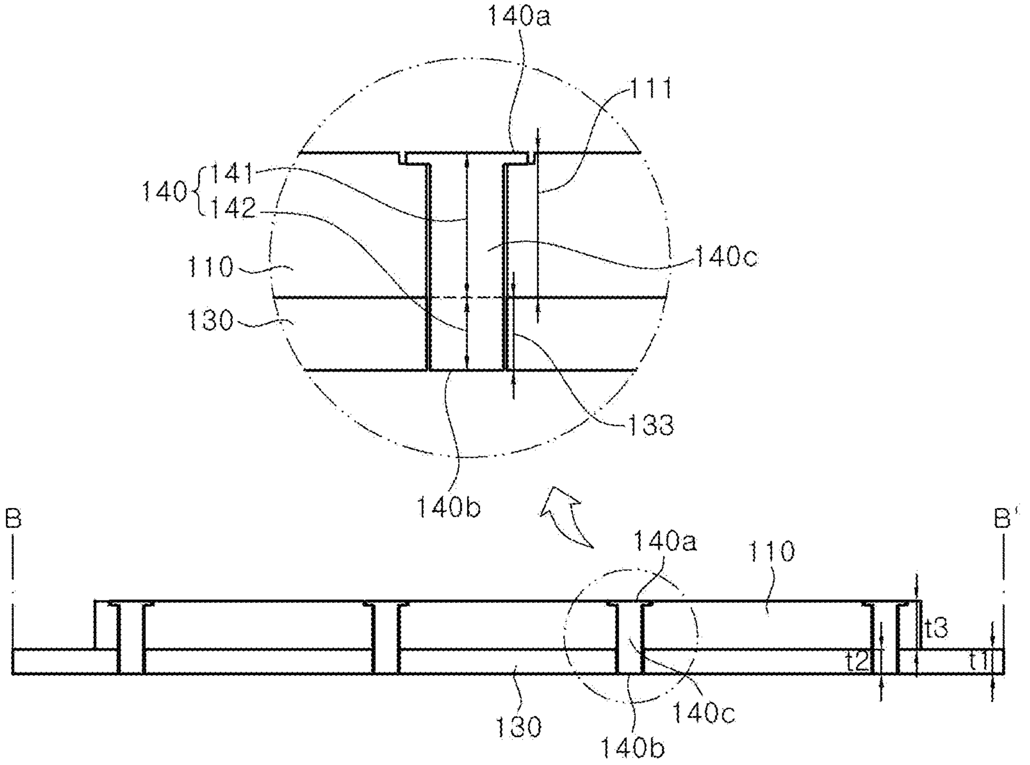
FIG. 2C is a B-B' cross-sectional view of the light emitting module according to FIG. 2A.

Referring to FIG. 2C, the substrate 130 may have a vertical maximum height from the upper surface to the lower surface. The vertical maximum height of the substrate 130 may be same regardless of an existence of the fastening portion 140. In some regions of the substrate 130, the fastening portions 140 are disposed. In some other regions of the substrate 130, the fastening portions are not disposed. A vertical maximum height from the upper surface to the lower surface of the substrate 130 in the region where the fastening portion 140 is disposed and a vertical maximum height from the upper surface to the lower surface of the substrate 130 in another region where the fastening portion 140 is not disposed may be same. Referring to FIG. 2C, a maximum thickness t2 of the substrate 130 on which the fastening portion 140 is disposed may be same as a maximum thickness t1 of the substrate 130 on which the fastening portion 140 is not disposed. Accordingly, regardless of whether or not the fastening portion 140 is disposed, the substrate 130 may be formed uniform and flat without any protrusions on both sides Thus, the lower surface of the substrate 130 may be formed uniform or flat without protruding regions protruding from the lower or supper surface of the substrate. With this, the light emitting module 100 of the present disclosure may be easily installed without limitation to an application target and thus, may be universally used.

In some implementations, a length of one side from the substrate 130 to the lens portion 110 may have a length corresponding to that of the fastening portion 140. Therefore, the length of the fastening portion 140 may be determined according to the length of one side of the substrate 130 and the lens portion 110, and a thickness of the substrate 130 may not be unnecessarily thick due to the fastening portion 140. Accordingly, the thickness t1 of the substrate 130 may have a thickness smaller than a thickness t3 of the lens portion 110. Preferably, the substrate 130 may have a thickness of 2 mm to 8 mm, and for example, the substrate 130 may have a thickness of 3 mm. As such, in the light emitting module 100 of the present disclosure, the substrate 130 is formed to be slimmer than the lens portion 110, and thus, a light emitting module 100 may be provided and may be used universally without limitation to a size of an application target.

The substrate 130 may function to dissipate heat from the light source portion 120 transmitted through the printed circuit board 121 of the light source portion 120 to the outside. The substrate 130 may be formed of a material having high robustness and durability and favorable thermal conductivity, and for example, the substrate 130 may be formed of aluminum. However, the inventive concepts are not limited thereto, and any metallic material may be used. Heat dissipation of the substrate 130 may be performed through a surface exposed to the outside.

A cable hole 131 may be included on one side of the substrate 130. The cable hole 131 may couple a cable portion 101 for supplying power to the light emitting module 100 according to the embodiment of the present disclosure.

The fastening portion 140 disposed in the first fastening hole 111 of the lens portion 110 and the second fastening hole 133 of the substrate 130 may couple the lens portion 110, the light source portion 120, and the substrate 130. The lens portion 110 and the substrate 130 may include a plurality of first and second fastening holes 111 and 133 for robust coupling. In addition, a plurality of fastening portions 140 may be disposed in the plurality of first and second fastening holes 111 and 133.

As shown in FIG. 2C, the fastening portion 140 may include an upper surface 140*a*, a lower surface 140*b*, and a through portion 140*c* extending from an inner circumferential surface of the upper surface 140*a* to the lower surface

140*b*. The upper surface 140*a* of the fastening portion 140 may have a width greater than a width of the through portion 140*c*. In addition, a width of one surface of the first fastening hole 111 to which the upper surface 140*a* of the fastening portion 140 is fastened may be formed greater than the width of the upper surface 140*a* of the fastening portion 140. Accordingly, the fastening portion 140 is not formed to protrude beyond one surface of the lens portion 110, and the upper surface 140*a* of the fastening portion 140 and one surface of the lens portion 110 may be flatly disposed at a substantially same height. Referring to an enlarged view of the fastening portion of FIG. 2C, the upper surface 140*a* of the fastening portion 140 may include a step on one surface of the lens portion 110 to be flatly coupled to one surface of the lens portion 110, and the fastening portion 140 may be secured to the step to form a flat surface. Accordingly, both opposite surfaces of the lens portion 110 and the substrate 130 may be formed flat.

In some implementations, the fastening portion 140 may be distinguished into the upper portion 141 and the lower portion 142. The upper portion 141 of the fastening portion 140 may be coupled with the first fastening hole 111, and the lower portion 142 of the fastening portion 140 may be coupled with the second fastening hole 133. The upper portion 141 of the fastening portion 140 and the lower portion 142 of the fastening portion 140 may have different heights, and the upper portion 141 of the fastening portion 140 may be formed more lengthily than the lower portion 142 of the fastening portion 140. In addition, the upper portion 141 and the lower portion 142 of the fastening portion 140 may be formed to have different widths in at least some regions. For example, one end of the upper portion 141 of the fastening portion 140 may be formed to have a width greater than that of one end of the lower portion 142 of the fastening portion 140, and conversely, one end of the lower portion 142 of the fastening portion 140 may be formed to have a width greater than that of one end of the upper portion 141 of the fastening portion 140. Accordingly, the fastening portion 140 may more robustly couple the lens portion 110 and the substrate 130.

As such, the light emitting module 100 fastens the substrate 130 and the lens portion 110 by the fastening portion 140, and it is possible to prevent moisture permeation through robust secureness and effective moisture protection. In addition, since the light emitting module 100 according to the embodiment of the present disclosure is robustly coupled through the fastening portion 140, when an external impact is applied, a coupling defect between the lens portion 110 and the substrate 130 may be prevented from occurring. Furthermore, when the light emitting module 100 receives the impact from the outside, since it is possible to maintain a coupled state between the lens portion 110 and the substrate 130, a moisture-proof function may also be maintained. That is, when the light emitting module 100 is applied to a lighting device (not shown in the drawings), moisture may be prevented from infiltrating into other components through a gap between the lens portion 110 and the substrate 130.

In the light emitting module according to an embodiment of the present disclosure, each component may be variously modified. In the following embodiments, to avoid duplication of descriptions, the descriptions will focus on differences from the above-described embodiments, and redundant details will be omitted.

Figure 3:
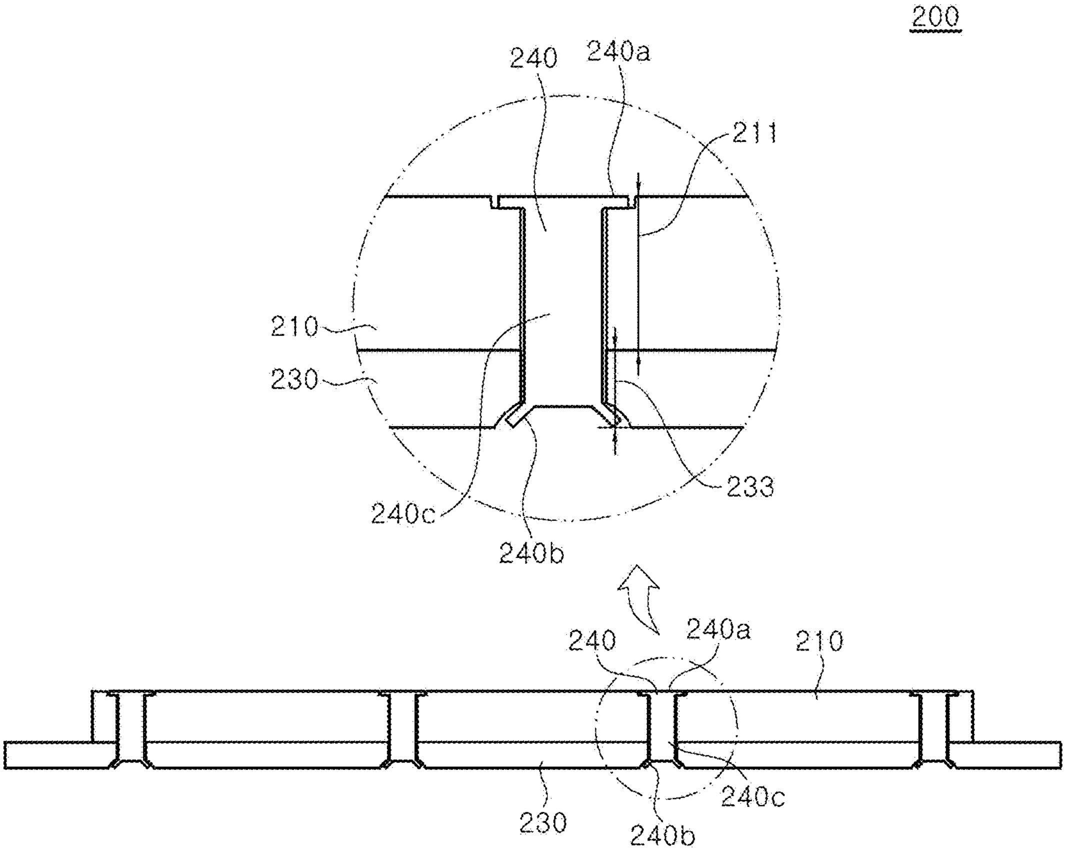
FIG. 3 is a schematic cross-sectional view illustrating a light emitting module according to another embodiment of the present disclosure.

FIG. 3 is a schematic cross-sectional view illustrating a light emitting module 200 according to another embodiment of the present disclosure.

Referring to FIG. 3, the light emitting module 200 has a same configuration as that of FIG. 1 except for a substrate 230, a second fastening hole 233, and a fastening portion 240.

The second fastening hole 233 of the substrate 230 may be disposed through an inner side of the substrate 230, and may be disposed in a shape at least partially concave with respect to a lower surface of the substrate 230. At least a portion of the fastening portion 240 may be disposed in the second fastening hole 233, and a lower portion of the second fastening hole 233 may have a stepped structure or an inclined structure having a width different from that of an upper portion such that the fastening portion 240 is fastened in a more robust state. A width of the stepped structure of the second fastening hole 233 may gradually increase toward a lower direction of the substrate 230. In addition, according to the stepped structure of the second fastening hole 233, at least a portion of the substrate 230 may include a stepped structure.

A lens portion 210, a light source portion 220, and the substrate 230 may be coupled by disposing the fastening portion 240 in a first fastening hole 211 of the lens portion 210 and the second fastening hole 233 of the substrate 230.

The lens portion 210 and the substrate 230 may include a plurality of first and second fastening holes 211 and 233 for coupling. In addition, a plurality of fastening portions 240 may be disposed in the first and second fastening holes 211 and 233. The fastening portion 240 may include an upper surface 240*a*, a lower surface 240*b*, and a through portion 240*c* extending from an inner circumferential surface of the upper surface 240*a* to an outer circumferential surface of the lower surface 240*b*. The upper surface 240*a* and the lower surface 240*b* of the fastening portion 240 may have a width greater than a width of the through portion 240*c*. Accordingly, a width of one surface of the first fastening hole 211 to which the upper surface 240*a* of the fastening portion 240 is fastened may be formed greater than the width of the upper surface 240*a* of the fastening portion 240, and a width of one surface of the second fastening hole 233 to which the lower surface 240*b* of the fastening portion 240 is fastened may be formed greater than the width of the lower surface 240*b* of the fastening portion 240.

When the lens portion 210 and the substrate 230 are coupled using the fastening portion 240, the upper surface 240*a* of the fastening portion 240 is disposed to be supported by a step of the first fastening hole 211 of the lens portion 210, and the lower surface 240*b* of the fastening portion 240 passes through the second fastening hole 233 of the substrate 230 to be disposed such that the lower surface 240*b* of the fastening portion 240 is exposed to outside of the substrate 230. Thereafter, pressure is applied from the lower surface of the substrate 230 toward the lens portion 210. The lower surface 240*b* of the fastening portion 240 is pressed by a physical force to form an inclined surface on at least a portion thereof, and the lens portion 210 and the substrate 230 may be compressed and coupled. Accordingly, the fastening portion 240 may combine the lens portion 210 and the substrate 230 with an instantaneous pressure, so that work speed and convenience may be increased.

The upper surface 240*a* of the fastening portion 240 may be formed as a flat surface. When the upper surface 240*a* of the fastening portion 240 is formed flat, physical force may be evenly distributed to the upper surface 240*a* of the fastening portion 240 while pressing to couple the lens portion 210 and the substrate 230. Accordingly, a bonding surface of the lens portion 210 and the substrate 230 may be bonded without tilting or partial lifting, and thus, light emitted from the light source portion 220 may form an optimized light profile according to light distribution characteristics of the lens portion 210, and an inflow of moisture from the outside may be minimized.

In order for both end surfaces 240*a* and 240*b* of the fastening portion 240 to be flat and robustly coupled to each surface of the lens portion 210 and the substrate 230, a step may be included on one surface of the lens portion 210 and the substrate 230, and the fastening portion 240 may be secured to the step to form a flat surface. Accordingly, opposing surfaces of the lens portion 210 and the substrate 230 are flat, and thus, a uniform force may be delivered to the plurality of fastening portions 240 when pressing for coupling. To deliver the uniform force to the fastening portions 240, it is preferable that the fastening portion 240 is disposed in a plurality of left-right or vertical symmetrical positions.

Figure 4:
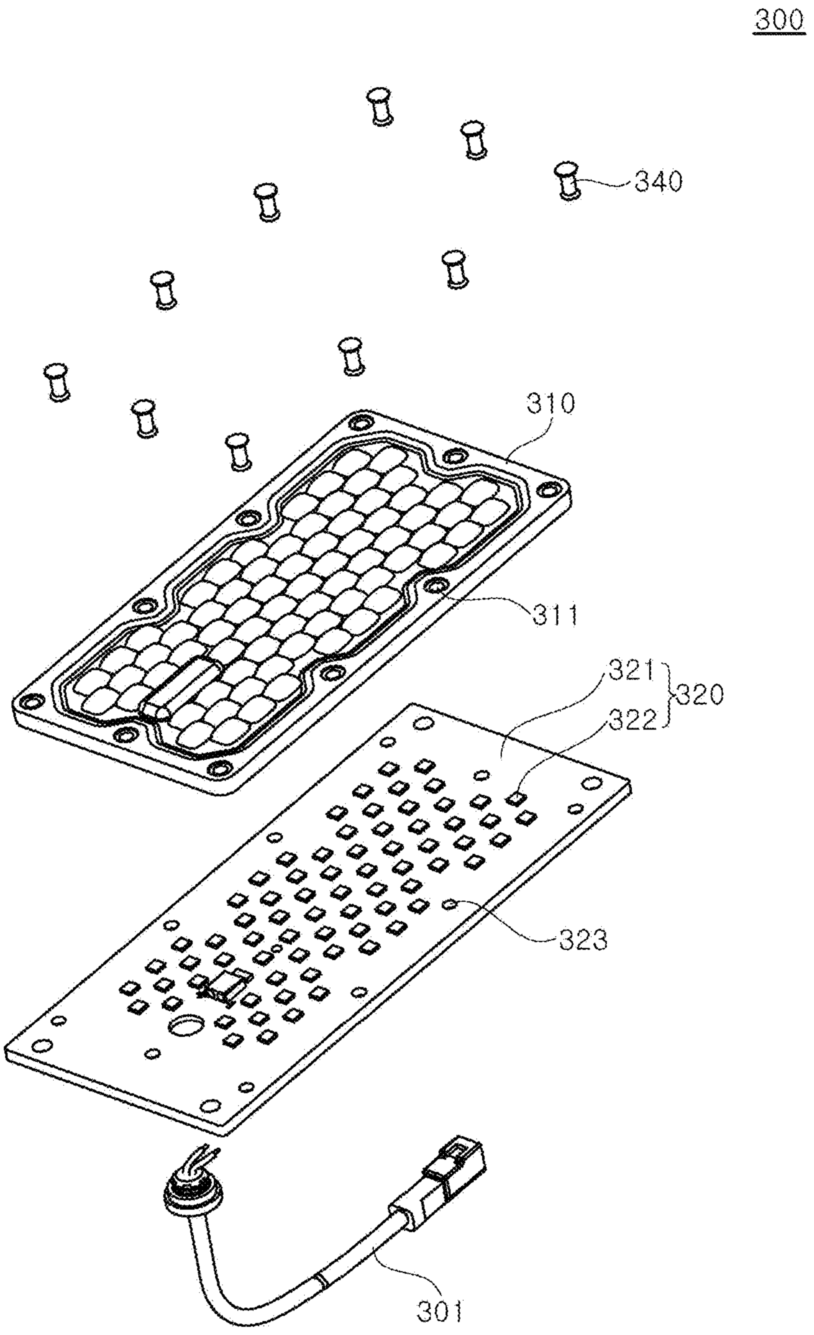
FIG. 4 is a schematic exploded perspective view illustrating a light emitting module according to another embodiment of the present disclosure.

FIG. 4 is a schematic exploded perspective view illustrating a light emitting module 300 according to another embodiment of the present disclosure.

Referring to FIG. 4, the light emitting module 300 has the same configuration as that of FIG. 1 except for a light source portion 320 and a substrate (not included).

A printed circuit board 321 of the light source portion 320 may be integrally formed with the substrate, and the printed circuit board 321 may replace the substrate. Accordingly, the printed circuit board 321 may be formed to have a thickness similar to that of the substrate. For example, it may have a thickness of 3 mm to 8 mm, and may have a thickness of 3 mm, for example. By integrating the substrate and the printed circuit board 321, the light emitting module 300 of the present disclosure may be formed thinner and lighter, and can be easily installed without limitation to an application target and used universally.

The printed circuit board 321 may be disposed corresponding to a lower surface of a lens portion 310, and at least a portion of the printed circuit board 321 may be disposed in contact with the lens portion 310. The printed circuit board 321 may be formed to have a width greater than that of the lens portion 310, without being limited thereto, and the printed circuit board 321 and the lens portion 310 may be formed to have similar widths. A light emitting device 322 may be secured to an upper surface of the printed circuit board 321, and a central axis of the printed circuit board 321 and a central axis of the lens portion 310 may coincide.

The printed circuit board 321 may include at least one third fastening hole 323 to be coupled with the lens portion 310. The third fastening hole 323 may be disposed at a position corresponding to a first fastening hole 311 of the lens portion 310. The third fastening hole 323 may be disposed through an inner side of the printed circuit board 321, and at least a portion of a fastening portion 340 may be disposed in the third fastening hole 323.

The printed circuit board 321 may function to dissipate heat generated from the light source portion 320 to the outside. The printed circuit board 321 may be formed of a material having high robustness and durability and favorable thermal conductivity, for example, aluminum. However, the inventive concepts are not limited thereto, and any metallic material may be used. Heat dissipation of the printed circuit board 321 may be performed through a surface exposed to the outside.

Figure 5:
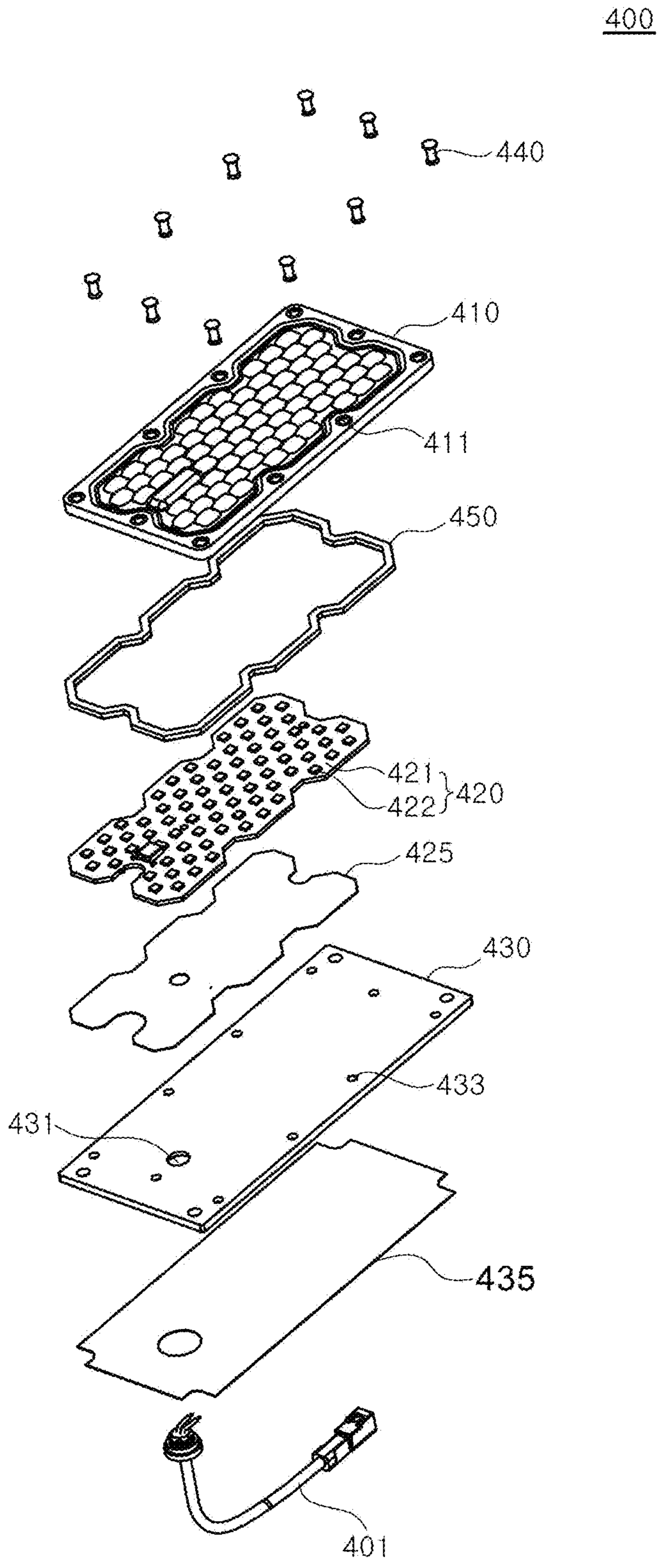
FIG. 5 is a schematic exploded perspective view illustrating a light emitting module according to another embodiment of the present disclosure.

FIG. 5 is a schematic exploded perspective view illustrating a light emitting module 400 according to another embodiment of the present disclosure.

Referring to FIG. 5, the light emitting module 400 has the same configuration as that of FIG. 1 except for a first adhesive layer 425, a second adhesive layer 435, and a sealing portion 450.

A light emitting device 422 may emit light, and at this time, heat may be generated. In addition, although not shown in the drawings, other elements disposed on a printed circuit board 421 may dissipate heat while operated. An increase in temperature of the light emitting device 422 may act as a major factor in reducing lifespan and performance. Accordingly, the first adhesive layer 425 may be further disposed on a lower surface of a light source portion 420.

The first adhesive layer 425 may be disposed while being adhered to a substrate 430 to prevent the light source portion 420 from rotating or leaving, and may include a heat dissipation function. The first adhesive layer 425 may be a thermal interface material (TIM), and may be, for example, a polymer composite adhesive, a metallic adhesive, an adhesive sheet, and a graphite sheet. The thermal interface material may play a role of heat dissipation on an interface with respect to heat generated from the light source portion 420.

The second adhesive layer 435 may be further disposed on a surface opposite to one surface of the substrate 430 on which the light source portion 420 is disposed. The second adhesive layer 435 is an accessory for constituting a lighting device of the light emitting module 400, and may be disposed while being adhered to the lighting device to prevent rotation or separation, and may include a heat dissipation function. The second adhesive layer 435 may be a metallic adhesive, an adhesive sheet, or a graphite sheet, and may play a role as a heat dissipation function for dissipating heat generated from the light source portion 420 to the outside.

The sealing portion 450 may be further disposed between the substrate 430 and a lens portion 410. More specifically, it may be disposed while being spaced apart from the light source portion 420 on an upper surface of the substrate 430. In addition, the sealing portion 450 may be formed along an edge of the printed circuit board 421 of the light source portion 420. That is, the light source portion 420 may be surrounded by the lens portion 410, the sealing portion 450, and the substrate 430. The sealing portion 450 may be formed of a material having elasticity. For example, it may be a material such as silicon, without being limited thereto.

The lens portion 410 and the substrate 430 may be coupled to each other through a fastening portion 440. When the lens portion 410 and the substrate 430 are fastened by the fastening portion 440, the lens portion 410 and the substrate 430 may press the sealing portion 450. Since the sealing portion 450 may be formed of an elastic material, the sealing portion 450 may seal the light source portion 420 between the lens portion 410 and the substrate 430. Accordingly, the sealing portion 450 may prevent moisture from infiltrating into the inside through a gap between the lens portion 410 and the substrate 430. Accordingly, the light emitting module 400 may prevent defects from occurring in the light source portion 420 due to moisture.

Moisture permeation through the gap between the lens portion 410 and the substrate 430 may be prevented by a coupling between the lens portion 410 and the substrate 430 through the fastening portion 440 and by the sealing portion 450 therebetween. Accordingly, when the light emitting module 400 is disposed outdoors, the inside may be robustly sealed against external impact, and is effective in waterproofing against rainwater and the like.

In this embodiment, the first adhesive layer 425, the second adhesive layer 435, and the sealing portion 450 are all included, but the inventive concepts are not limited thereto, and at least one of additional components may be included.

Various embodiments of the present disclosure have been described in the above, but the inventive concepts are not limited only to the above embodiments. In addition, features or components of an embodiment can also be applied to other embodiments without departing from the spirit and scope of the present disclosure.

The invention claimed is:

1. A light emitting apparatus, comprising:

a substrate including a lower substrate surface and a lower fastener hole;

a lens disposed on an upper region of the substrate and including an upper fastener hole coupled with the lower fastener hole;

a light source region including a plurality of light sources arranged under the lens; and a fastener disposed in the upper fastener hole and the lower fastener hole, wherein the lens includes a convex region and a flat region in an upper region of the lens, the fastener including a lower fastener surface, wherein the lower substrate surface is flat and the lower fastener surface is substantially flush with the lower substrate surface, wherein the convex region includes a plurality of convexities corresponding to the plurality of light sources, wherein the flat region is disposed on an outer region of the convex region, wherein the plurality of convexities includes first convexities on a first row arranged longitudinally in a central region of the substrate and second convexities on a second row arranged longitudinally and spaced apart from the first row, and wherein a number of the first convexities arranged in the first row is greater than a number of the second convexities arranged in the second row.

2. The light emitting apparatus of claim 1, wherein the upper fastener hole and the fastener are disposed on the flat region of the lens, and an upper region of the fastener and an upper region of the flat region have a substantially same height without protruding from the upper region of the fastener.

3. The light emitting apparatus of claim 1, wherein a first height of the lens that is from the upper region of the substrate to an upper region of the flat region is smaller than a second height of the lens that is from the upper region of the substrate to an upper most region of the convex region.

4. The light emitting apparatus of claim 1, wherein the plurality of convexities in the second row includes a discontinuous region that includes the flat region.

5. The light emitting apparatus of claim 4, wherein the upper fastener hole is disposed in the flat region adjacent to the discontinuous region.

6. The light emitting apparatus of claim 1, wherein a central axis of the lens coincides with a central axis of the light source region.

7. The light emitting apparatus of claim 6, wherein the first row is disposed on the central axis.

8. A light emitting apparatus, comprising:

a substrate including a lower substrate surface and a lower fastener hole;

a lens disposed on an upper region of the substrate and including an upper fastener hole coupled with the lower fastener hole;

a light source region including a plurality of light sources arranged under the lens; and a fastener disposed in the upper fastener hole and the lower fastener hole, the fastener including a lower fastener surface, wherein the lower substrate surface is flat and the lower fastener surface is substantially flush with the lower substrate surface, wherein the lens includes a convex region and a flat region in an upper region of the lens, wherein the convex region includes a plurality of convexities corresponding to the plurality of light sources, wherein the plurality of convexities includes a first row arranged longitudinally in a central region of the substrate and a second row arranged longitudinally and spaced apart from the first row, and wherein the flat region is disposed on an outer region of the light source region, and the flat region in the second row is broader than the flat region in the first row.

9. The light emitting apparatus of claim 8, wherein the upper fastener hole and the fastener are disposed on the flat region of the lens, and an upper region of the fastener and an upper region of the flat region have a substantially same height without protruding from the upper region of the fastener.

10. The light emitting apparatus of claim 8, wherein a first height of the lens that is from the upper region of the substrate to an upper region of the flat region is smaller than a second height of the lens that is from the upper region of the substrate to an upper most region of the convex region.

11. The light emitting apparatus of claim 8, wherein the plurality of convexities in the second row includes a discontinuous region that includes the flat region.

12. The light emitting apparatus of claim 11, wherein the upper fastener hole is disposed in the flat region adjacent to the discontinuous region.

13. The light emitting apparatus of claim 8, wherein a central axis of the lens coincides with a central axis of the light source region, and the first row is disposed on the central axis.

14. A light emitting apparatus, comprising:

a substrate including a lower substrate surface and a plurality of lower fastener holes;

a lens disposed on an upper region of the substrate and including a plurality of upper fastener holes coupled with the plurality of lower fastener holes;

a light source region including a plurality of light sources arranged under the lens; and a plurality of fasteners disposed in the plurality of upper fastener holes and the plurality of lower fastener holes, individual ones of the fasteners having lower fastener surfaces, wherein the lower substrate surface is flat and the lower fastener surfaces of the individual ones of the fasteners are substantially flush with the lower substrate surface, wherein the lens includes a convex region and a flat region in an upper region of the lens, wherein the convex region includes a plurality of convexities corresponding to the plurality of light sources, wherein the plurality of convexities includes a first row arranged longitudinally in a central region of the substrate and a second row arranged longitudinally and spaced apart from the first row, and wherein an upper fastener hole of the plurality of upper fastener holes is disposed on the flat region arranged on a side of the plurality of convexities of the first row.

15. The light emitting apparatus of claim 14, wherein the upper fastener hole and a fastener of the plurality of fasteners are disposed on the flat region of the lens, and an upper region of the fastener and an upper region of the flat region have a substantially same height without protruding from the upper region of the fastener.

16. The light emitting apparatus of claim 14, wherein a first height of the lens that is from the upper region of the substrate to an upper region of the flat region is smaller than a second height of the lens that is from the upper region of the substrate to an upper most region of the convex region.

17. The light emitting apparatus of claim 14, wherein the plurality of convexities in the second row includes a discontinuous region that includes the flat region.

18. The light emitting apparatus of claim 17, wherein at least one of the plurality of upper fastener holes is disposed in the flat region adjacent to the discontinuous region.

19. The light emitting apparatus of claim 18, wherein a central axis of the lens coincides with a central axis of the light source region.

20. The light emitting apparatus of claim 19, the first row is disposed on the central axis.

21. The light emitting apparatus of claim 1, wherein a lower surface of the lens is in direct contact with an upper surface of the substrate.

22. The light emitting apparatus of claim 1, wherein the substrate has a first thickness, and wherein the flat region of the lens has a second thickness greater than the first thickness of the substrate.

* * * * *